United States Patent [19]

Benezech

[11] 4,172,230
[45] Oct. 23, 1979

[54] ELECTRICAL CONNECTORS FOR MAGNETO STATOR

[75] Inventor: Jacques Benezech, Le Vesinet, France

[73] Assignee: NOVI-P.B., Pantin, France

[21] Appl. No.: 883,580

[22] Filed: Mar. 6, 1978

[30] Foreign Application Priority Data

Apr. 6, 1977 [FR] France .................................. 77 10371

[51] Int. Cl.$^2$ ............................................ H02K 11/00
[52] U.S. Cl. ............................. 310/70 A; 123/149 R
[58] Field of Search ................... 310/70 R, 70 A, 153, 310/72, 74; 322/51, 52, 89–91; 307/10 R; 123/149 R

[56] References Cited

U.S. PATENT DOCUMENTS

| | | | |
|---|---|---|---|
| 3,324,841 | 6/1967 | Kebbon et al. | 123/149 R |
| 3,821,570 | 6/1974 | Burson | 310/70 A |

Primary Examiner—Mark O. Budd
Attorney, Agent, or Firm—Karl F. Ross

[57] ABSTRACT

A multipolar stator for magneto basically comprises a central cast-aluminum plate to which are rigidly secured the coils, points, and condenser of the ignition and electricity-generating system. Each of these active circuit components has a terminal extending outwardly beyond the periphery of this metallic disk. An insulating semirigid synthetic-resin ring surrounds this metal plate and is provided with connections that can be secured to these terminals so that wiring can lead from the connections out of the ring. Thus the rotor assembly comprises two separate subassemblies, one conductive and one insulating, and allows a parts supplier to stock various standard items to form a multiplicity of different stator types.

12 Claims, 9 Drawing Figures

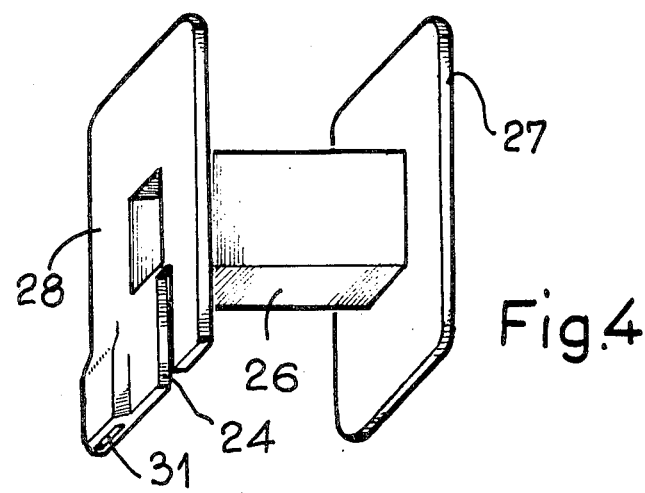
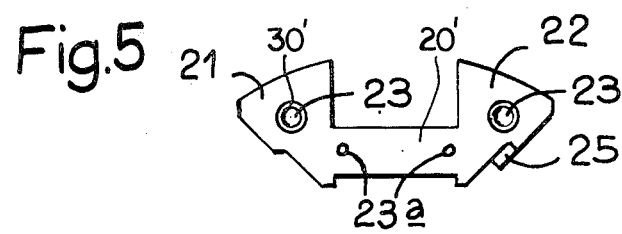
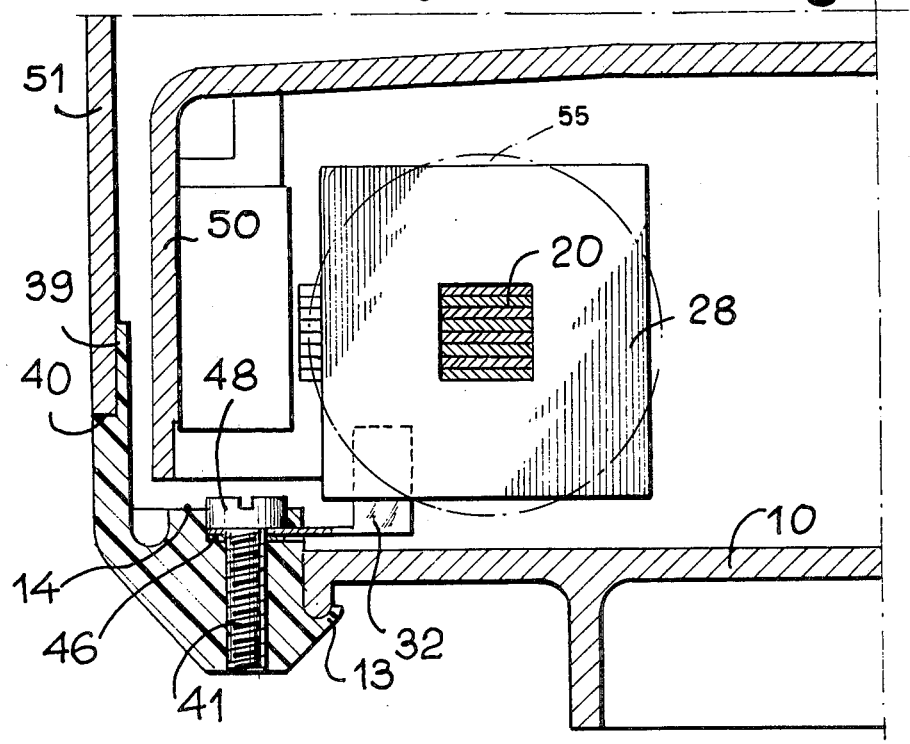

ELECTRICAL CONNECTORS FOR MAGNETO STATOR

FIELD OF THE INVENTION

The present invention relates to a multipolar stator for a magneto. More particularly this invention concerns such a stator which is fixed adjacent a flywheel-mounted rotor and which incorporates various active circuit elements such as ignition points and voltage-generating coils.

BACKGROUND OF THE INVENTION

A magneto generating system such as described in my U.S. Pat. No. 3,377,486 has several different windings which are fixed on a stator adjacent a rotor such as described in my commonly owned and copending patent application 883,570 filed Mar. 6, 1978, the entire disclosure of which is herewith encorporated by reference. At least one of the windings of such a stator normally is connected to a set of points mounted on the stator and cooperating with a cam on the rotor, and to the vehicle ignition system. Another winding energizes the headlight, and yet another serves to trickle-charge the battery that in turn is responsible for powering of the running lights, directional lights, horn, instrument lights, and the like. Thus it is normally necessary to provide quite a few active circuit elements on the stator. At least four coils are needed, a set of points or an electromagnetic sensor for controlling the ignition, and an ignition condenser. All of these active circuit components must be exactly positioned, in particular the coils. At the same time they must be kept out of the path of the rotor which moves at high speed.

In a two-wheeled vehicle it is also essential that the magneto assembly be as compact and lightweight as possible. Thus this magneto assembly is usually a very complex device which must be assembled with extreme care and which therefore is quite expensive. Furthermore each such magneto stator must virtually be custom-made for the particular requirements, so that it is necessary for a parts dealer to stock a great number of such stators at a correspondingly high cost, as it is impossible to adapt one type of stator for use in another application.

OBJECTS OF THE INVENTION

It is therefore an object of the present invention to provide an improved multipolar stator for a magneto.

Another object is the provision of such a stator which can easily be assembled and which can also be produced at relatively low cost.

A further object is the provision of an improved multipolar magneto stator which is set up so that it can readily be adapted for different applications.

SUMMARY OF THE INVENTION

These objects are attained according to the present invention in a multipolar stator comprised basically of a central metallic plate which is surrounded by an insulating synthetic-resin ring. The plate has a front face and a periphery and is adapted to be fixed adjacent the rotor with its face turned toward the rotor. A plurality of bosses formed on this face within the periphery each have a threaded bore for the mounting of a plurality of active circuit components including at least one coil. Each component has at least one terminal extending outwardly beyond the periphery of the metallic ring and the ring is provided with a plurality of connections each alignable with a respective one of the terminals. Means, typically in the form of simple terminal screws, are provided for connecting each of the connections to a respective one of the terminals and the connections are provided in turn each with a respective conductor leading from the ring.

More particularly according to this invention the ring is formed with a plurality of concentric annular grooves each receiving a respective one of the conductors which therefore are recessed in the annular ring.

Thus in accordance with the instant invention the active circuit components are all rigidly mounted on the metal plate that itself is bolted adjacent the flywheel of the vehicle and immediately next to the rotor carrying permanent magnets as described in the above-cited copending application. The necessary terminals of these components extend outwardly and are secured to the insulating ring where the various connections are made to the wires or cables that extend to the vehicle lighting system, ignition system, and so on. The assembly can be put together in very simple stages and it is possible to vary the wiring simply by switching its outer rings. Thus a parts supplier can stock a plurality of standard internal plates with coils and the like, and a plurality of external rings, any of which can be combined with any other to form a very large number of different stator assemblies adapted to different applications.

According to further features of this invention the central metal plate, which is grounded inherently by being normally tightly bolted to the motor block or motor-vehicle frame carries a plurality of coils angularly equispaced about the central rotation axis for the rotor and each serving its respective function. In addition this plate carries either a set of points or an electromagnetic angular-position indicator for operating the ignition system, as well as a ignition condenser. The terminal for the coil that energizes the ignition system, for the live one of the set of points, and for the ungrounded side of the ignition condenser can all be connected together on the semirigid synthetic-resin ring so that only a single conductor need lead out of this ring to the ignition system. The other conductors can respectively go to the battery-charging network, the headlight switch, and so on. The mounting of the coils on the rigid metal plate formed of cast aluminum ensures that they will exactly be aligned within the rotor.

Each of the coils according to this invention is formed by a stack of ferromagnetic plates held between a pair of end plates and traversed by throughgoing holes through which extend securing rivets. In addition each such core is surrounded by a synthetic-resin sheath forming a pair of end flanges and finally a coil of wire is wrapped around this sheath. The one end flange is notched and the one end of the coil is wound around a tab formed on one of the end plates for grounding of one side of the respective coil. The other side of the coil is connected in a socket formed in the one synthetic-resin end plate to a metal tab that in turn forms the terminal for the respective coil.

The ring and the plate are formed with interfitting grooves and ridges so as securely to lock them together once the screws interconnecting the terminals and the connection are in place.

BRIEF DESCRIPTION OF THE DRAWING

FIG. 4 is a perspective view of the sheaths surrounding a coil core according to this invention;

FIG. 5 is a plan view of a coil core end plate according to this invention;

FIG. 6 is an axial section through a portion of a fully assembled magneto according to this invention;

SPECIFIC DESCRIPTION

Figure 1:
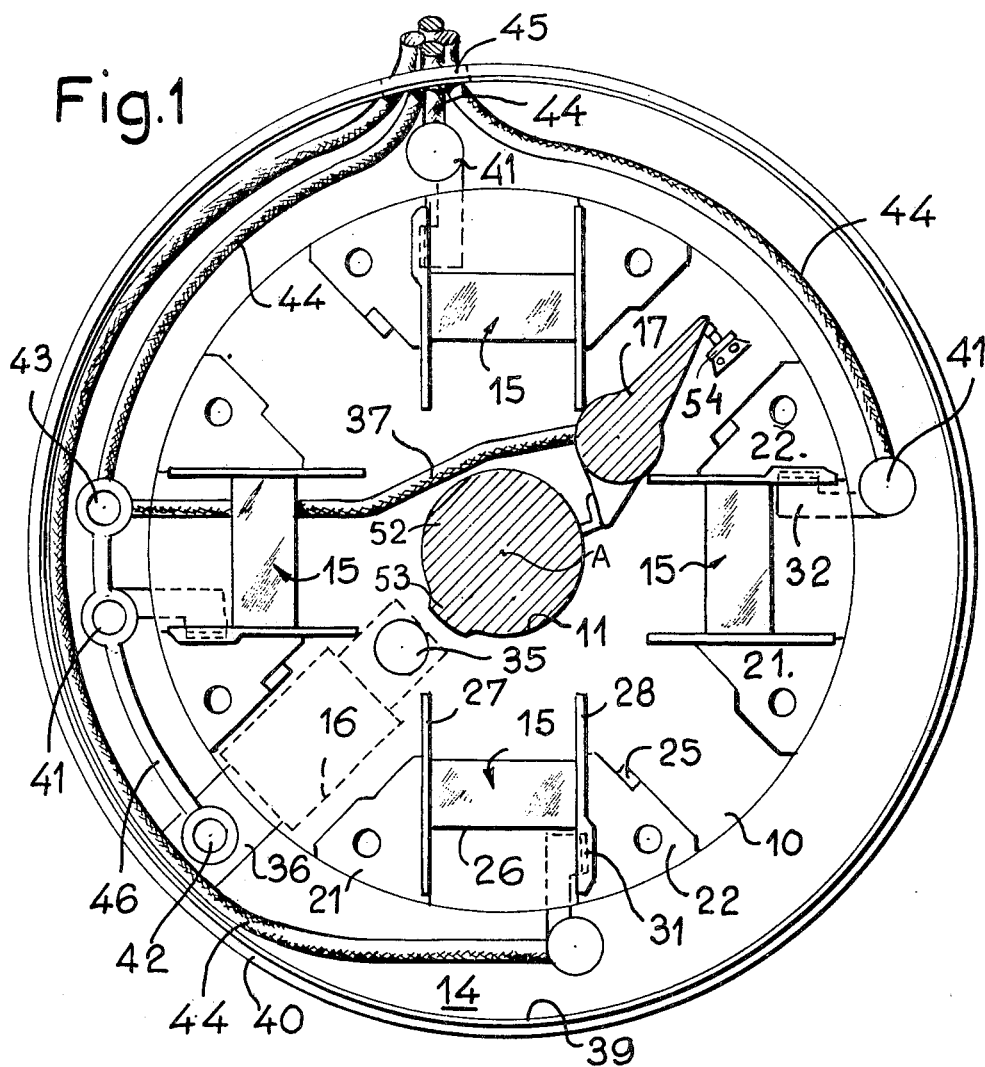
FIG. 1 is a top view partly in section of a stator according to this invention with the coil windings removed for clarity of view.
Figure 2:
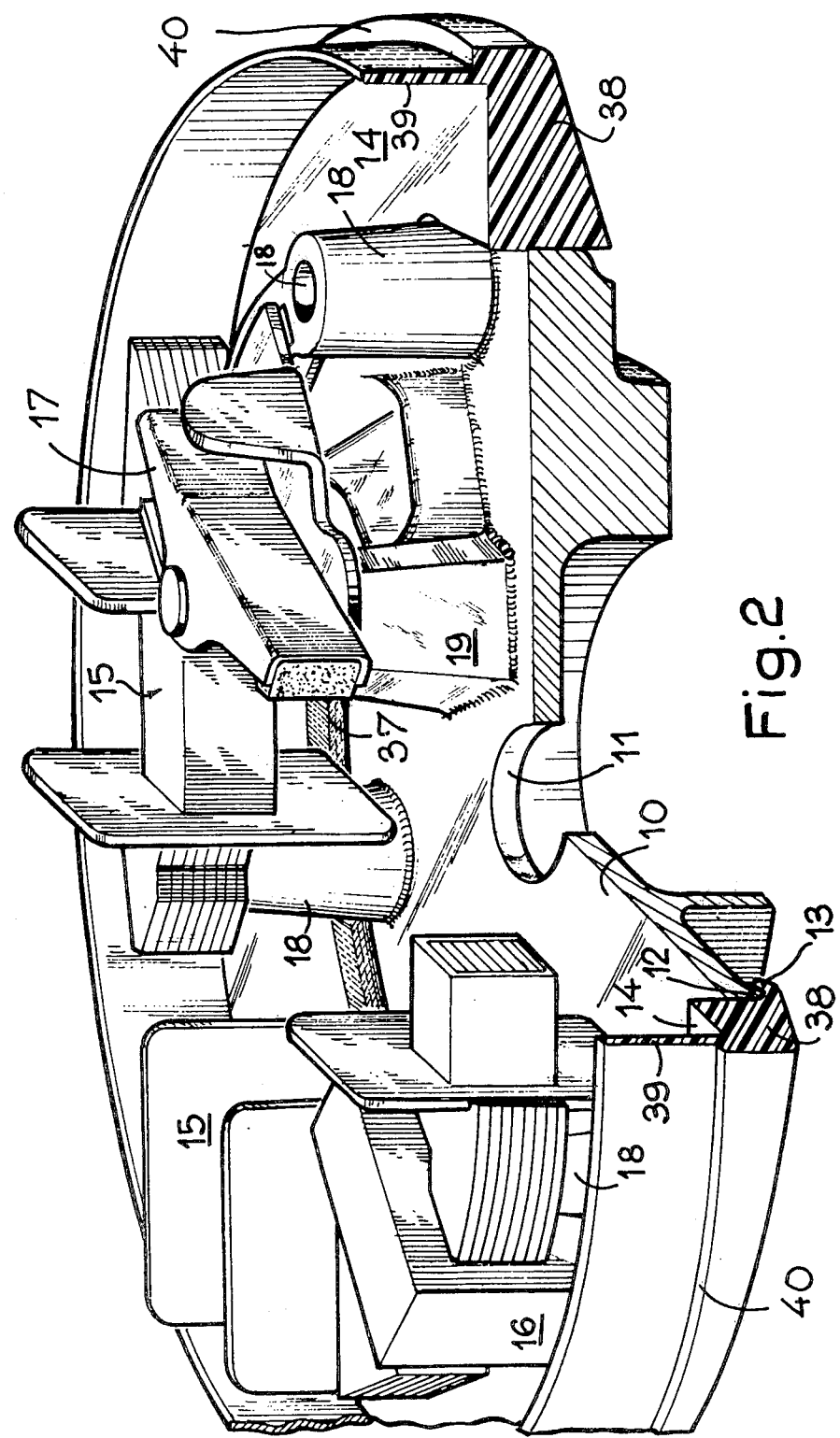
FIG. 2 is a partly broken away section view of the stator ring of FIG. 1.

A stator according to the instant invention basically comprises a cast-aluminum central plate 10 formed at its center on an axis A with a circular throughgoing hole 11 and having an outer rim formed with an axially downwardly projecting rim 12 received in a corresponding upwardly open groove 13 of a semirigid synthetic-resin disk 14. The internal metal plate 10 carries four angularly equispaced coils 15 and, diametrically opposite each other, an ignition condenser 16 and a movable point 17. To this end the plate 10 is formed as shown in FIGS. 1 and 2 with eight substantially angularly equispaced bosses 18 having threaded holes 18' to which are secured the coils 15, and with diametrically opposite internally threaded bosses 19 for the condenser 16 and pivotal point 17.

Figure 3:
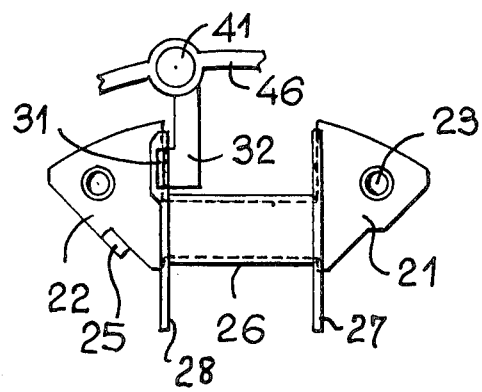
FIG. 3 is a detail view of FIG. 1.
Figure 9:
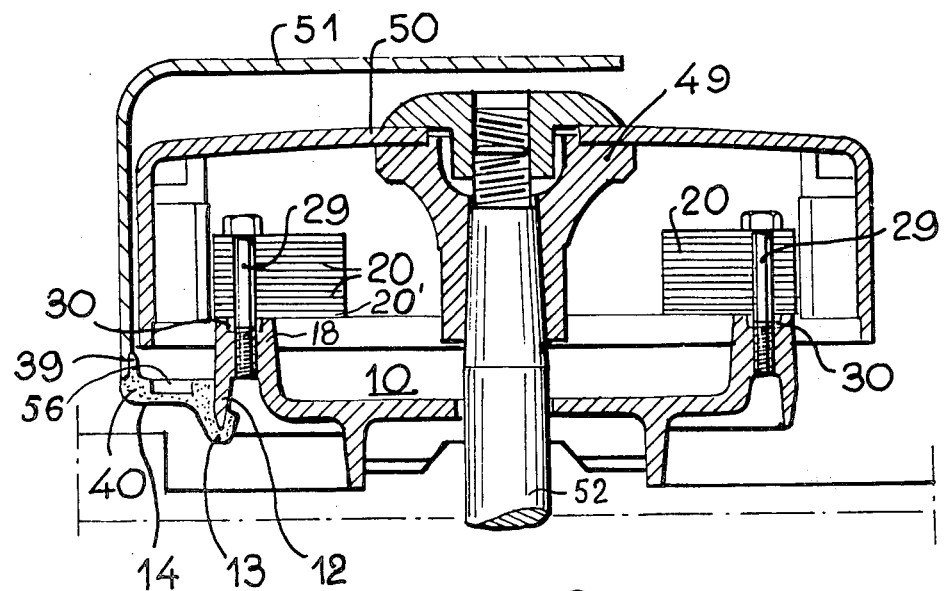
FIG. 9 is an axial section through a magneto according to the instant invention.

Each coil 15 is formed of a stack of ferromagnetic plates 20 as shown in FIGS. 3, 5, and 6 each having a pair of ends 21 and 22 whose outer edges conform to a cylindrical surface having a diameter slightly smaller than the inside diameter of the rotor in which the stator is to fit. Between their ends 21 and 22 the stack of plates 20 is formed with a pair of punched-out holes in which rivets 23a are received. The lowermost end plate 20' is formed with the small downwardly bent tab 25 to which one end of a winding shown diagrammatically at 55 in FIG. 6 is secured for grounding of this end of the winding. At each of the poles 21 and 22 there is formed an axially throughgoing hole 23 through each of which extends as shown in FIG. 9 a machine screw 29 whose lower end is threaded into the hole 18' of the respective boss 18. The holes 18' are counterbored at 30 so that the lips 30' formed on the plate 20' at each bore 23 extend into these counterbores 30 and ensure excellent centering of the holes 23 over the holes 18'.

Figure 7:
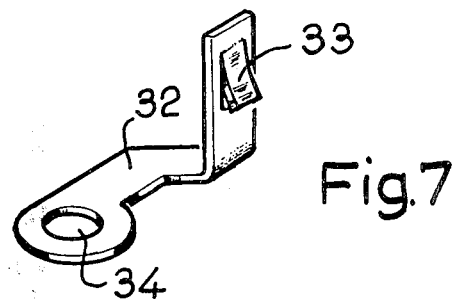
FIG. 7 is a perspective view of a connector tab for a coil according to this invention.

In addition as shown in FIG. 4 there is provided between each of the windings 55 in the core formed by the plates 20 a synthetic-resin square-section sheath 26 having a pair of unitarily molded end flanges 27 and 28. The one end flange 28 is formed with the notch 24 that normally lies adjacent the above-mentioned tab 25 so that the end of the wire at the inner side of the coil 55 can pass out through this notch 24 and be secured to the tab 25. Adjacent this notch 24 the end flange 28 is formed with a rectangular-section socket 55 into which is inserted the other end of the winding 55. A double L-shaped connector tab 32 shown in FIG. 7 has one leg formed with an outwardly extending barb 33 that is fitted into the socket 31 and another end formed with an eye 34 that normally extends radially outwardly beyond the outer rim of the plate 10.

The ignition condenser 16 extends radially of the axis A and has an inner connector tab 35 held via a machine screw to the threaded bore of the respective boss 19 and an outer tab 36 which extends outwardly past the rim of the plate 10 into a corresponding radially inwardly open recess of the ring 14.

The live point 17 is pivotal on a respective boss 19 about an axis parallel to the axis A in a manner well known in the art. This live point 17 has a portion riding on the periphery of the shaft 52 so that when engaged by a cam bump 53 on this rotor shaft 52 it will separate from a grounded point 54 directly screwed to the plate 10. Thus the electrical ground connection between the points 17 and 54 will be opened each time the shaft 52 makes a full revolution. An insulated conductor 37 extends from this live point 17 underneath one of the coils 15 and extends outwardly past the rim of the plate 10.

The ring 14 has a thickened securing portion 38 formed with an upwardly extending thin rim 39 forming a shoulder 40 on which rests a magneto cover 51 shown in FIG. 9. In addition the thickened portion 38 is formed with concentric grooves 56 one of which is visible in FIG. 9.

Figure 8:
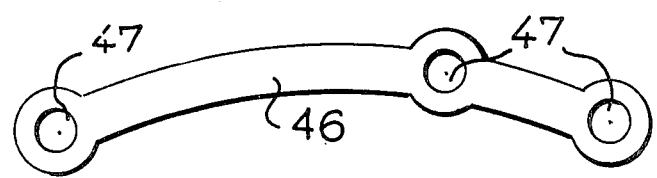
FIG. 8 is a plan view of a conductor strip usable in the arrangement of FIGS. 1–6.

Each of the connector tabs 32 from the ungrounded ends of the respective coils 55 is traversed by a machine screw 41 threaded into the ring 14 and having a head 48 bearing tightly on the eye portion 34 of the tab 32. A similar such screw 42 is threaded through the eye formed in the outer ungrounded tab of the condenser 16 and yet another such screw 43 is threaded downwardly through the eye on the insulated conductor for the live point 17 diametrically opposite the condenser 16. Insulated conductors 44 lying in the grooves 56 have eyes at their outer ends which are connected to these various terminals 41–43. These four insulated conductors 44 all extend out through the outer rim of the ring 14 through a hole 45 which may be provided with a plug-in connector. The screw at the terminal for one of the coils 15 is connected as shown in FIG. 1 by a flat conductor 46 shown in greater detail in FIG. 8. This arcuate flat brass conductor 46 is formed with three throughgoing holes 47 through which also pass the screws 42 and 43 for the condenser 16 and live point 17. Thus the respective wire 44 can be connected directly to the ignition coil, as the interconnection of the one coil 15, the condenser 16, and the live point 17 is made inside the stator.

In use the shaft 42 of a rotor 50 having a hub 49 passes through the hole 11 as shown in FIG. 9. Details of the construction of this rotor can be seen in the above-cited commonly filed and commonly owned patent application Ser. No. 883,579 whose entire disclosure is herewith incorporated by reference.

The above-described stator therefore comprises two basic subassemblies, namely the central plate 10 carrying all of the active components, and the outer ring 14 carrying the various connections and wires. Though interconnection can take place exclusively through snug interfitting in combination with insertion of the screws at the terminals, as the outer assembly is relatively light and does not need to be bolted as securely as the internal plate 10. Furthermore since the plate 10 is invariably bolted directly to the motor block or vehicle frame it will provide an excellent ground for the grounded ends of the coils 15 as well as for the grounded side of the condenser 16 and the grounded point 54.

It is also noted that it is completely within the scope of this invention to replace the movable live point 17 and grounded point 54 with an electromagnetic-sensing device. This is normally done by providing a small permanent magnet upon the shaft 52 and using a small coil in the place of the live element 17 that in turn operates a transistor circuit to replace the mechanical points. Such an arrangement is useful in an electronic ignition system.

I claim:

1. A multipolar stator for a magneto, said stator comprising:
   a central metallic plate having a front face and a periphery, said plate being adapted to be fixed adjacent a rotor with said face turned toward said rotor;
   a plurality of bosses on said face within said periphery and each formed with a threaded bore;
   an insulating ring secured to and surrounding said metallic plate and having a face turned in the same direction as said face of said rotor;
   a plurality of active circuit components mounted on said bosses and including at least one coil, each component having at least one terminal extending outwardly beyond said periphery;
   a plurality of connections on said ring each alignable with a respective one of said terminals;
   means electrically connecting each of said connections to a respective one of said terminals; and
   conductors leading from said connections out of said ring.

2. The stator defined in claim 1 wherein said ring is formed with an annular groove and said plate is formed with an annular ridge fitting into said groove.

3. The stator defined in claim 1 wherein said ring is formed with a plurality of concentric annular grooves each receiving a respective one of said conductors.

4. The stator defined in claim 1 wherein said coil includes a core secured to two of said bosses, an insulating sheath over said core, and a winding over said core and sheath and having one end secured to a respective one of said terminals and another grounded through said sheath to said plate.

5. The stator defined in claim 4 wherein said sheath has a flange formed with a socket and said terminal connected to said one end of said coil is a conductive metal strip having a leg seated in said socket and another leg extending outwardly and joined to the respective connection.

6. The stator defined in claim 5 wherein said core has a curved edge corresponding substantially to the curvature of the inner periphery of said ring.

7. The stator defined in claim 6 wherein said core is formed of a stack of metal plates and a plurality of rivets securing said stack together.

8. The stator defined in claim 5 wherein said sheath is formed with a slot through which said other end of said coil extends and one of said plates of said stack has a tab around which said other end is wrapped.

9. The stator defined in claim 1 wherein said active elements include a condenser having one end connected to and grounded on one of said bosses and another end forming one of said terminals.

10. The stator defined in claim 9 wherein said active elements include a live point carried on but insulated from said plate, a cable connecting said live point to one of said connections, and a grounded point fixed on and grounded to said plate, said points being diametrically opposite said condenser.

11. The stator defined in claim 1 wherein said ring is formed with a throughgoing hole through which pass said conductors.

12. The stator defined in claim 1 wherein said active elements include in addition to said coil a set of points and a condenser, said conductors including a flat metal strip lying on said ring and interconnecting the connections of one side of said coil, one side of said condenser, and one of said points.

* * * * *